(12) United States Patent
Zlokarnik et al.

(10) Patent No.: US 6,594,630 B1
(45) Date of Patent: Jul. 15, 2003

(54) VOICE-ACTIVATED CONTROL FOR ELECTRICAL DEVICE

(75) Inventors: Igor Zlokarnik, Watertown, MA (US); Daniel Lawrence Roth, Boston, MA (US)

(73) Assignee: Voice Signal Technologies, Inc., Woburn, MA (US)

( * ) Notice: Subject to any disclaimer, the term of this patent is extended or adjusted under 35 U.S.C. 154(b) by 0 days.

(21) Appl. No.: 09/443,957

(22) Filed: Nov. 19, 1999

(51) Int. Cl.[7] .......................... G10L 15/04; G10L 15/10; G10L 15/06; G10L 21/06

(52) U.S. Cl. ........................ 704/256; 704/270; 704/275; 704/241

(58) Field of Search ................................ 704/270, 275, 704/251–256, 241

(56) References Cited

U.S. PATENT DOCUMENTS

| | | |
|---|---|---|
| 3,555,192 A | 1/1971 | Hymer |
| 3,818,481 A | 6/1974 | Dorfman et al. |
| 4,052,568 A | 10/1977 | Jankowski |
| 4,119,797 A | 10/1978 | Wollert |
| 4,433,435 A | 2/1984 | David |
| 4,691,341 A | 9/1987 | Knoble et al. |
| 4,776,016 A | 10/1988 | Hansen |
| 4,797,795 A | 1/1989 | Callahan |
| 4,811,399 A * | 3/1989 | Landell et al. ............... 704/253 |
| 4,829,576 A | 5/1989 | Porter |
| 4,843,627 A | 6/1989 | Stebbins |
| 4,912,766 A * | 3/1990 | Forse ........................ 704/225 |
| H891 H | 2/1991 | Hashimoto |
| 5,086,385 A * | 2/1992 | Launey et al. ............... 704/270 |
| 5,199,080 A | 3/1993 | Kimura et al. |
| 5,351,272 A | 9/1994 | Abraham |
| 5,430,826 A | 7/1995 | Webster et al. |
| 5,488,273 A | 1/1996 | Chang |
| 5,493,618 A | 2/1996 | Stevens et al. |

(List continued on next page.)

FOREIGN PATENT DOCUMENTS

| | | |
|---|---|---|
| DE | 28 40 132 A1 | 3/1980 |
| DE | 297 13 054 U1 | 12/1997 |
| DE | 297 18 636 U1 | 3/1998 |
| WO | WO 99/35637 | 7/1999 |

OTHER PUBLICATIONS

Proxi (PROXI product description, Jul. 1999).*
Training And Search Algorithms For An Interactive Word-spotting System.

(List continued on next page.)

*Primary Examiner*—Doris H. To
*Assistant Examiner*—Daniel A. Nolan
(74) *Attorney, Agent, or Firm*—Lawrence G. Fridman

(57) ABSTRACT

An apparatus for voice-activated control of an electrical device comprises a receiving arrangement for receiving audio data generated by user. A vioce recognition arrangement is provided for determining whether the received audio data is a command word for controlling the electrical device. The voice recognition arrangement includes a microprocessor for comparing the received audio data with voice recognition data previously stored in the voice recognition arrangement. The voice recognition arrangment generates at least one control signal based on the comparison when the comparison reaches a predetermined threshold value. A power control controls power delivered to the electrical device. The power control is responsive to at least one control signal generated by the voice recognition arrangement for operating the electrical device in response to the at least one audio command generated by the user. An arrangement for adjusting the predetermined threshold value is provided to cause a control signal to be generated by the voice recognition arrangement when the audio data generated by the user varies from the previously stored voice recognition data.

16 Claims, 6 Drawing Sheets

U.S. PATENT DOCUMENTS

| | | | |
|---|---|---|---|
| 5,504,836 A | | 4/1996 | Loudermilk |
| 5,615,271 A | | 3/1997 | Stevens et al. |
| 5,644,061 A | | 7/1997 | King et al. |
| 5,664,061 A | * | 9/1997 | Andreshak et al. ......... 704/275 |
| 5,774,841 A | * | 6/1998 | Salazar et al. ........... 704/270.1 |
| 5,790,754 A | | 8/1998 | Mozer et al. |
| 5,802,488 A | | 9/1998 | Edatsune |
| 5,809,470 A | | 9/1998 | Monjo |
| 5,815,586 A | | 9/1998 | Dobbins |
| 5,841,878 A | | 11/1998 | Arnold et al. |
| 5,878,395 A | | 3/1999 | Bennett |
| 5,890,121 A | * | 3/1999 | Borcherding ............... 704/270 |
| 5,960,393 A | * | 9/1999 | Cohrs et al. ................ 704/275 |
| 6,188,986 B1 | | 2/2001 | Matulich et al. |
| 6,208,971 B1 | * | 3/2001 | Bellegarda et al. ......... 704/275 |

OTHER PUBLICATIONS

Aritcle 2. An Improved Endpoint Detector for Isolated Word Recognition.
Sensory, Inc. Interactive Speech Prod., RSC–164, Recognition. Synthesis. Control 1996.
Speaker Dependent/Speaker Independent Publication 1997.
Speech Recognition Circuit Publication 1997.
Programming the HM2007 Publication 1997.
Sensory Voice Activation Advertisement, Intela Voice, VOS Systems, Sensory, Inc. 1998.
Sensory Voice Activation Publication, IntelaVoice, VOS Systems, Sensory, Inc., Jan. 8, 1998.
Wall Street Journal Publication, VOS Systems, Inc., Mar. 10, 1998.
North County Times, VOS Systems, Inc. Publication Apr. 4, 1998, Switches that are activated by voice.
San Francisco Chronicle, VOS Systems, Inc. Publication, May 12, 1998.
San Diego Publication, VOS Systems, Inc., Intela Voice, Aug. 3, 1998.
Poway News Chieftain, VOS Systems, Inc., Aug. 20, 1998.
1998 publication about RSC–164 voice recognition chip on Mars.
Intela Voice Switch, The Transponder, Mar. 1998 VOS Systems, Inc. advertisement.
SmartSwitch VOS Systems Press Release, Sunnyvale, CA., Oct. 15, 1997.
Sensory RSC 164, Union Electric Corp., Taiwan, Autodialer, Las Vegas, NV. Jan. 8, 1997 Press Release.
Voice Signal Tech., VoiceDimmer advertisement @1996.
Voice Connexion, Intro Voice Pro–Module advertisement @1996.
Sensory, Inc., VoiceDirect, Interactive Speech, Speaker–Dependent Speech Recognition Solution @1996.
Noise Estimation Techniques For Robust Speech Recognition, H.G. Hirsch, C. Ehrlicher 1995.
Acoustic–Phonetic Modeling in the SPICOS System, Hermann Ney and Andras Noll, 1994.
Egbert, Simplicity Series 5, Voice Recognition Environmental Control Unit, Midddlesex News, Jun. 9, 1998 article.
Subband or Cepstral Domain Filering for Recognition of Lombard and Channel–Distorted Speech, Hanson & Appelbaum 1993.
Simplicity Series 5, Quartet Tech. Owners' Manual 1990 or 1995?.
Sensory, Interactive Speech (TM) Overview 1997.
Sensory Circuits, Inc., RSC–164 Development Kit Manual
Sensory Circuits, Inc., Development Kit Manual no date.
Programming the HM2007 1997.
Sensory Circuits, Inc., RSC–164 Recognition . Synthesis . Control @1995.
Sensory Circuits, Inc., RSC–164 Development Kit Manual @1996.
Voice Trek Beta System 1.0 User's Guide, Advanced Home Automation @1997.
Commandk of Eric Bernard Designs & Beech Assoc. article by Timothy O. Bakke, Popular Science of Dec. 1990, p. 112.
EDN, A Cahners Pub., vol. 40, No. 2, Cache Memory/Speech Recognition, Jan. 19, 1995, pp. 4, 41–46.
Electronic House, New Products article, Apr. 1996, p. 50
SmartSwitch advertisement, Voice Signal Technologies, Inc. Dec. 1, 1996 Pub.
Computerworld, In Depth article, Nov. 11, 1996 by Kim Girard.
Enabling Design, Office Design, Apr. 1997 article by Alvin Rosenbaum.
MASS and Dragon Dictate article by James Hunter, Phoenix Dev. Group –HT1News article, Jun. 1997.
Imagesco.com, Speaker Dependent/Speaker Independent speech recognition publication 1997.
Wall Street Journal, Mar. 10, 1998, VOS Systems, Inc.
Sensory, Inc., RSC–164 Data Sheet, pp. 1–8, 1996.
Lereboullet, Voice Recognition Processors (Database), pp. 1–12, Nov., 1996.
Sensory, Inc., Voice Direct TM, Speech Recognition IC, pp. 1–4, 1996.
Beranek, Leo, Acoustics, McGraw–Hill Book Company, Inc., pp. 338, 407, 414, 415 and 419, 1954.
Printed Excerpts of Images Company's Web Page–Speech Regognition Circuit; Speaker Dependent/Speaker Independent.
Programming the HM 2007; Printed Dec. 4, 1997.
Printed Excerpts of Voice Connexion, Inc.'s Web Page–Intro Voice Pro–Module; Printed Dec. 4, 1997.
Printed Excerpts of Sensory, Inc.'s Web Page –RSC–164 Datasheet; Printed Nov. 19, 1997.

* cited by examiner

VOICE-ACTIVATED CONTROL FOR ELECTRICAL DEVICE

FIELD OF THE INVENTION

This invention relates to the field of speech recognition and, more particularly, to utilizing human speech for controlling voltage supplied to electrical devices, such as lights, lighting fixtures, electrical outlets, volume, or any other electrical device.

BACKGROUND OF THE INVENTION

The ability to detect human speech and recognize phonemes has been the subject of a great deal of research and analysis. Human speech contains both voiced and unvoiced sounds. Voiced speech contains a set of predominant frequency components known as formant frequencies which are often used to identify a distinct sound.

Recent advances in speech recognition technology have enabled speech recognition systems to migrate from the laboratory to many services and products. Emerging markets for speech recognition systems are appliances that can be remotely controlled by voice commands. With the highest degree of consumer convenience in mind, these appliances should ideally always be actively listening for the voice commands (also called keywords) as opposed to having only a brief recognition window. It is known that analog audio input from a microphone can be digitized and processed by a micro-controller, micro-processor, micro-computer or other similar devices capable of computation. A speech recognition algorithm can be applied continuously to the digitized speech in an attempt to identify or match a speech command. Once the desired command has been found, circuitry which controls the amount of current delivered to a lighting fixture or other electrical device can be regulated in the manner appropriate for the command which has been detected.

One problem in speech recognition is to verify the occurrence of keywords in an unknown speech utterance. The main difficulty arises from the fact that the recognizer must spot a keyword embedded in other speech or sounds ("wordspotting") while at the same time reject speech that does not include any of the valid keywords. Filler models are employed to act as a sink for out-of vocabulary speech events and background sounds.

The performance measure for wordspotters is the Figure of Merit (FOM), which is the average keyword detection are over the range of 1–10 false alarms per keyword per hour. The FOM increases with the number of syllables contained in a keyword (e.g. Wilcox, L. D. and bush, M. A.: "Training aid search algorithms for an interactive wordspotting system" Proc. of ICASSP, Vol. II, pp 97–100, 1992) because more information is available for decision making. While using longer voice commands provides an easy way of boosting the performance of wordspotters, it is more convenient for users to memorize and say short commands. A speech recognition system's susceptibility to a mistaken recognition, i.e. a false alarm, generally decreases with the length of the command word. A longer voice command makes it more difficult for a user to remember the voice command vocabulary, which may have many individual words that must be spoken in a particular sequence.

Some speech recognition systems require the speaker to pause between words, which is known as "discrete dictation." The intentional use of speech pauses in wordspotting is reminiscent of the early days of automatic speech recognition (e.g. Rabiner, L. R.: "On creating reference templates for speaker-independent recognition of isolated words", IEEE Trans, vol. ASSP-26, no 1, pp. 34–42, February, 1978), where algorithmic limitations required the user to briefly pause between words. These early recognizers performed so-called isolated word-recognition that required the words to be spoken separated by pauses in order to facilitate the detection of word endpoints, i.e. the start and end of each word. One technique for detecting word endpoints is to compare the speech energy with some threshold value and identify the start of the word as the point at which the energy first exceeds the threshold value and the end as the point at which energy drops below the threshold value (e.g. Lamel, L. F. et al: "An Improved Endpoint Detector for Isolated Word Recognition", IEEE Trans., Vol. ASSP-29, pp. 777–785, August, 1981). Once the endpoints are determined, only that part of the input that corresponds to speech is used during the pattern classification process. In this prior art technique, the pause is not analyzed and therefore is not used in the pattern classification process.

Speech Recognition systems include those based on Artificial Neural Networks (ANN), Dynamic Time Warping (DTW), and Hidden Markov Models (HMM).

DTW is based on a non-probabilistic similarity measure, wherein a prestored template representing a command word is compared to incoming data. In this system, the start point and end point of the word is known and the Dynamic Time Warping algorithm calculates the optimal path through the prestored template to match the incoming speech.

The DTW is advantageous in that it generally has low computational and memory requirements and can be run on fairly inexpensive processors. One problem with the DTW is that the start point and the end point must be known in order to make a match to determine where the word starts and stops. The typical way of determining the start and stop points is to look for an energy threshold. The word must therefore be preceded and followed by a distinguishable, physical speech pause. In this manner, there is initially no energy before the word, then the word is spoken, and then there is no energy after the word. By way of example, if a person were to say <pause> "one" <pause>, the DTW algorithm would recognize the word "one" if it were among the prestored templates. However, if the phrase "recognize the word one now" were spoken, the DTW would not recognize the word "one" because it is encapsulated by other speech. No defined start and end points are detected prior to the word "one" and therefore the speech recognition system can not make any determination about the features of that word because it is encapsulated in the entire phrase. Since it is possible that each word in the phrase has no defined start point and end point for detecting energy, the use of Dynamic Time Warping for continuous speech recognition task substantial limitations.

In the Artificial Neural Network approach, a series of nodes are created with each node transforming the received data. It is an empirical (probabilistic) technology where some end number of features is entered into the system from the start point and the outpoint becomes the probabilities that those features came from a certain word. One of the major drawbacks of ANN is that it is temporally variable. For example, if a word is said slower or faster than the prestored template, the system does not have the ability to normalize that data and compare it to the data of the stored template. In typical human speech, words are often modulated or vary temporarily, causing problems for speech recognition based on ANN.

The Artificial Neural Network is advantageous in that it's architecture allows for a higher compression of templates and therefore requires less memory. Accordingly, it has the ability to compress and use less resources in terms of the necessary hardware than the Hidden Markov Model.

The Hidden Markov Model has several advantages over DTW and ANN for speech recognition systems. The HIM can normalize an incoming speech pattern with respect to time. If the templates have been generated at one cadence or tempo and the data comes in at another cadence or tempo, the HMM is able to respond very quickly. For example, the HMM can very quickly adjust for a speaker using two different tempos of the word "run" and "ruuuuuuun." Moreover, the HMM processes data in frames of usually (16 to 30 milliseconds), allowing it to have very fast response time. Since each frame is processed in real time, the latency for HMM is less than for DTW algorithms which require an entire segment of speech before processing can begin.

Another advantage which distinguishes the HMM over DTW and ANN is that it does not require a defined starting or end point in order to recognize a word. The HMM uses qualitative means of comparing the features in an input stream to the stored templates eliminating the need to distinguish the start and end points. It uses a statistical method to match the sound that is being detected with any sound that is contained in it's templates and then outputs a score which is used to determine a match. Although the HMM is superior to it's counterparts, it is known from the prior art that its implementation to commercial fixed-point embedded systems (which are clearly different from PC platforms) has been neglected.

Many prior art speech recognition systems have a detrimental feature with respect to command word template generation. When templates are generated from data produced by recorded human speech, they may not accurately represent the way every person says a command word. For example, if a user's particular speech pattern differs significantly from the template data, then very poor performance from the speech recognition system will be experienced when compared to a user whose speech pattern is more similar to the template data. In an HMM recognizer, words are scored by their probability of occurrence. The closer a word is to it's prestored template, the higher it's probability is calculated. In order for a word to be considered a match, a preset decision threshold is used. In order to be recognized, the similarity between the uttered word data and the template has to exceed the preset decision threshold. Many speech recognition systems have not provided the user with any means of adjusting the preset decision threshold.

SUMMARY OF THE INVENTION

As to one aspect, the invention solves the above-identified problems of the prior art by requiring the user to pause at least in between individual words of an audio or voice command. As an example, the command to turn on the lights becomes "lights<pause>on" or "<pause>lights<pause>on<pause>." Viewing the pauses as a substitute for syllables, this new command exhibits the same number of syllables as "turn lights on" and "please turn the lights on," respectively. This improves the FOM without requiring the speaker to memorize more words and the required word order in a voice command.

Accordingly, it is important to note the following key differences between the use of speech pauses in the present invention and in the prior art isolated-word recognition:

1) The invention treats the speech pauses as part of the keywords and as such treats them just like any other speech sound. Thus, the particular spectral qualities of the input signal during speech pauses are essential for a keyword to be correctly detected. In contrast, the prior art isolated-word recognition discards speech pauses during a pre-processing step; and 2) The purpose of the speech pauses in the present invention is to make the keywords longer rather than to simplify endpoint detection. In fact, no explicit endpoint detection is performed at all in the present invention.

It is therefore an object of the present invention to provide a system and method for more accurately recognizing speech commands without increasing the number of individual command words.

It is a further object of the invention to provide an apparatus for controlling an electrical device, such as a lighting fixture including an incandescent lamp or any other suitable electrical load by speech commands.

It is an even further object of the invention to provide a means for adjusting the threshold comparison value between prestored voice recognition data and uttered audio data to thereby accommodate users with different voice patterns.

According to the invention, an apparatus for voice-activated control of an electrical device has receiving means for receiving at least one audio command generated by a user. The at least one audio command has a command word portion and a pause portion, with each of the audio command portions being at least one syllable in length. Voice recognition data is provided with a command word portion and a pause portion. Each of the voice recognition data portions are also at least one syllable in length. Voice recognition means is provided for comparing the command word portion and the pause portion of the at least one received audio command with the command word portion and the pause portion, respectively, of the voice recognition data. The voice recognition means generates at least one control signal based on the comparison. Power control means is provided for controlling power delivered to an electrical device. The power control means is responsive to the at least one control signal generated by the voice recognition means for operating the electrical device in response to the at least one audio command generated by the user.

Further according to the invention, a method of activating an electrical device through voice commands, comprises the steps of: recording voice recognition data having a command word portion and a pause portion, each of the voice-recognition data portions being at least one syllable in length; receiving at least one audio command from a user, the at least one audio command having a command word portion and a pause portion, each of the audio command portions being at least one syllable in length; comparing the command word portion and the pause portion of the at least one received audio command with the command word portion and the pause portion, respectively, of the voice recognition data; generating at least one control signal based on the comparison; and controlling power delivered to an electrical device in response to the at least one control signal for operating the electrical device in response to the at least one received audio command.

According to a further embodiment of the invention, an apparatus for voice-activated control of an electrical fixture comprises receiving means for receiving audio data generated by a user and voice recognition means for determining if the received audio data is a command word for controlling the electrical fixture. The voice recognition means includes a microcontroller with a fixed-point embedded microprocessor, a speech recognition system operably associated with the microcontroller and including a Hidden Markov Model for comparing data points associated with the received audio data with data points associated with voice recognition data previously stored in the voice recognition means. The voice recognition means generates at least one control signal based on the comparison when the comparison reaches a predetermined threshold value. Power control means are provided for controlling power delivered to the electrical fixture. The power control means is responsive to the at least one control signal generated by the voice recognition means for operating the electrical device in response to the at least one audio command generated by the user.

According to an even further embodiment of the invention, an apparatus for voice-activated control of an electrical device comprises receiving means for receiving audio data generated by a user and voice recognition means for determining if the received audio data is a command word for controlling the electrical device. The voice recognition means including a microprocessor for comparing the received audio data with voice recognition data previously stored in the voice recognition means. The voice recognition means generates at least one control signal based on the comparison when the comparison reaches a predetermined threshold value. Power control means is provided for controlling power delivered to the electrical device. The power control is responsive to the at least one control signal generated by the voice recognition means for operating the electrical device in response to the at least one audio command generated by the user. Also provided is means for adjusting the predetermined threshold value to thereby cause a control signal to be generated by the voice recognition means when the audio data generated by the user varies from the previously stored voice recognition data.

According to an even further embodiment of the invention, a method of activating an electrical device through an audio command generated by a user comprises recording voice recognition data, receiving audio data generated by a user, comparing the received audio data with the recorded voice recognition data, generating at least one control signal based on the comparison when the comparison reaches a predetermined threshold value, controlling power delivered to an electrical device in response to the at least one control signal to thereby operate the electrical device in response to the generated audio data, and adjusting the predetermined threshold value to generate the control signal when the audio data generated by the user varies from the previously stored voice recognition data.

Other objects, advantages and features of the invention will become apparent upon reading the following detailed description and appended claims, and upon reference to the accompanying drawings.

BRIEF DESCRIPTION OF THE DRAWINGS

The preferred embodiments of the present invention will hereinafter be described in conjunction with the accompanying drawings, wherein like designations denote like elements throughout the drawings, and wherein.

DETAILED DESCRIPTION OF THE PREFERRED EMBODIMENTS

Figure 1:
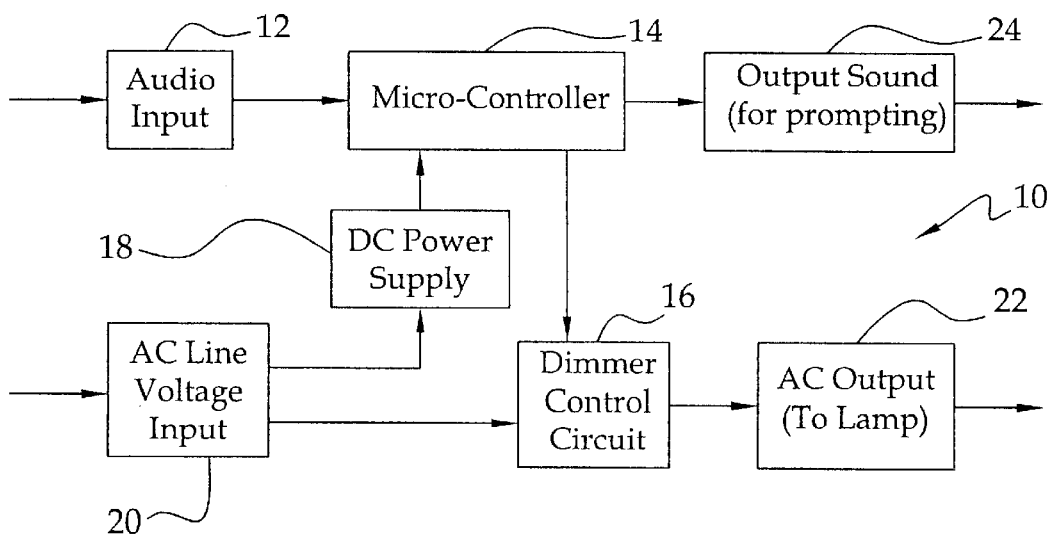
FIG. 1 shows a block diagram of an apparatus for voice-activated control of an electrical device according to the present invention.

Referring now to the drawings, and to FIG. 1 in particular, a functional block diagram of an apparatus 10 for receiving and processing voice commands according to the present invention is illustrated. The apparatus 10 comprises an audio input 12 that is monitored by a micro-controller 14 which performs processing functions associated with a programmed speech recognition algorithm in an attempt to identify voice commands. Once a voice command has been identified, the micro-controller 14 directs a dimmer control circuit 16 or other electrical control or switching circuit to take an appropriate action. The power required for operation of the micro-controller and other associated electronic units comes from a conventional 5 V DC power supply 18, that may be converted from an alternating current voltage input 20. Once a voice command has been recognized by the micro-controller 14, the control circuit 16 is manipulated to provide appropriate AC (or DC) output 22 to an external electrical device, such as a lamp, electrical outlet, and so on.

The micro-controller 14 preferably includes an 8-bit or 16-bit MCU embedded, fixed-point microprocessor as the central processing unit (CPU), an on-chip analog to digital (A/D) converter, a Read Only Memory (ROM) bank, a Static Random Access Memory (SRAM) bank, and general purpose Input-Output (I/O) ports. This embedded system is specifically different from a PC system, in that it does not have the ability to be modified once the program has been loaded into the chip; it does not have a disk drive or any other means of being changed. It has firmware as opposed to software, and it does not have a monitor or a keypad. It has a very specific purpose that once the system is loaded with the firmware (hardware), it is only allowed to perform one specific task which is to analyze incoming audio data and comparing that data to one or more sets of prestored data to thereby control an outside electrical device. Unlike a PC which has a general purpose processing unit that can do a multitude of tasks from word-processing to game play to speech recognition, for instance; the system of the present invention that runs the Hidden Markov Model is embedded and all contained on a single PC board. The microphone and all of the analog and digital circuitry, including all of the control circuitry and means for interacting with the speech recognition system is preferably contained on a single printed circuit board. The printed circuit board with all of it's components is preferably enclosed in a stand-alone housing (not shown), such as a plastic box, that has a electrical plug for connection with an electrical receptacle. Preferably, the housing also includes electrical receptacles for accepting electrical devices of one type or another to be controlled by voice command.

The audio input 12 may be in the form of a microphone or similar device for inputting audio signals into the apparatus 10. The input signals are then filtered and sent to two amplifiers (not shown) having different gains. The micro-controller processes the analog signal from the channel with the highest gain unless there are data over-ranges. When over-ranges are encountered, the channel with lower gain is utilized. This effectively provides for more dynamic range in the input audio signal without the delay associated with other Automatic Gain Circuits (which have a time delay associated with correction of gain).

An audio output device 24 may be provided as feedback means and instructions to the user. Compressed speech may be stored in System Memory and played back to the user at the appropriate time. This synthesized speech can be used for prompting during a training process where the user(s) is prompted to speak for creating voice templates prior to use. The Audio Output device 24 is preferably in the form of a speaker element.

The apparatus 10 interfaces directly with any source of AC power 20 in general and is specifically adapted to interface with a common household AC (120 Vrms in the USA) power outlet via a connector plug (not shown). The connector plug is polarized, with the larger of the two prongs connecting to "common" (white) of a normal household power outlet. The "hot" (black) input is fused with a 5 amp fuse as a safety measure.

The AC Input 20 is connected to the Dimmer Control Circuit 16 as well as to a full-wave rectifier which is part of the DC Power Supply 18.

The Dimmer Control Circuit 16 controls the current delivered to a lighting fixture (not shown) or other similar load and is regulated by a TRIAC. In this manner, it is possible to turn the fixture on or off, so it can be dimmed without dissipative power losses. The TRIAC is driven by an opto-coupler and is therefore electrically isolated from the circuitry of the apparatus 10 which contains the audio input amplifier, the micro-controller 14, and other related functional circuitry.

The input AC signal feeds into a zero-crossing detection circuit (not shown) and generates a trigger pulse which is used as the clock input for several one-shots with time constants adjusted to provide pulse trains at 33% and 66% of the AC line frequency duty cycle. These pulse trains are supplied to a multiplexer (not shown) which is controlled by the micro-controller 14 adapted for selecting an appropriate digital pulse train to drive the opto-coupler.

Several bits from Port O of the speech recognition chip (bits 2 and 3) select the appropriate channel of the multiplexer which is adapted for driving this circuit. It has four states:

| Bit 1 | Bit 0 | State |
|---|---|---|
| 0 | 0 | ON |
| 1 | 0 | 2/3 ON (dim) |
| 0 | 1 | 1/3 ON (low dim) |
| 1 | 1 | OFF |

Figure 2:
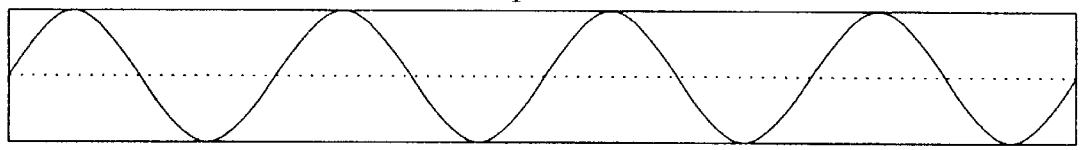
FIG. 2 is an output timing diagram showing the AC output delivered to a lighting fixture or other similar load.
Figure 2:
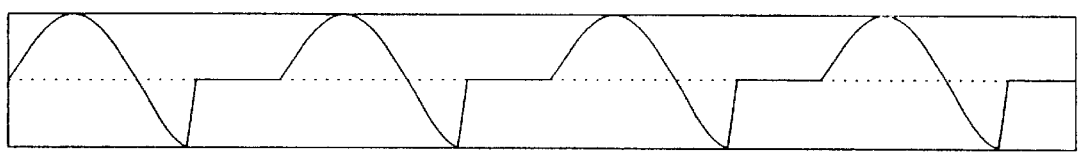
Figure 2:
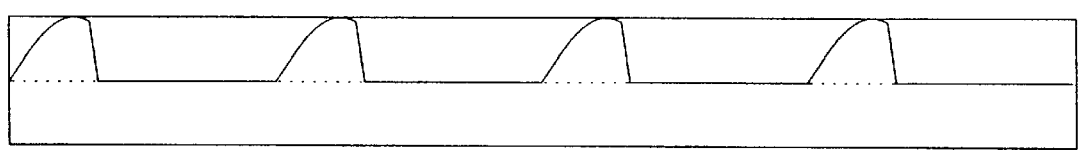

For the 1/3 ON dim selection, the TRIAC is on 33% of the time, allowing current to flow to the lighting fixture or other similar load. When the TRIAC turns off, the current does not flow to the fixture. This causes the lighting fixture to appear dim. In this technique, power is not dissipated by the dimmer circuit when the lights are dimmed. Output waveforms for each of the above states are illustrated in FIG. 2.

The AC input 20 is connected to the DC power supply 18, which includes a full wave rectifier, voltage regulator, and other components form part of the power supply 18 and provide a 5 Volt supply with minimum ripple (5 millivolts maximum ripple). De-coupling capacitors are preferably used between the power and ground pins of the integrated circuit components to limit noise.

Thus, the invention provides an apparatus which utilizes a microphone for continuously monitoring an audio input signal, and by using speech recognition techniques, identifies the desired human speech commands and controls the current delivered to a lighting fixture including an incandescent lamp or any other suitable load once the appropriate command has been detected.

Figure 3:
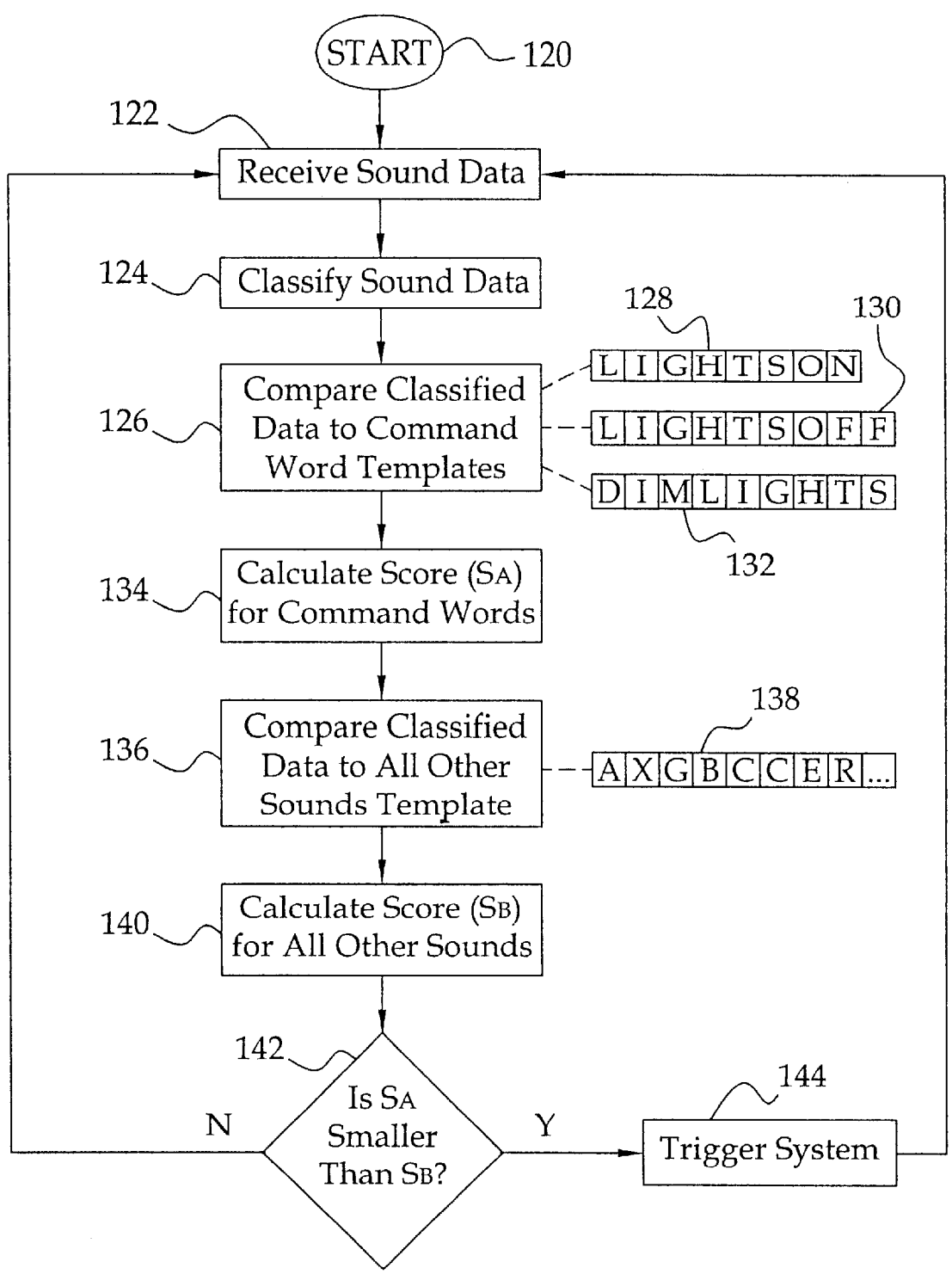
FIG. 3 is a process flow chart for use with the invention for recognizing the presence of a voice command.

Turning now to FIG. 3, a typical method of receiving sound data and recognizing voice commands from the sound data for use in the apparatus 10 is illustrated. When the apparatus 10 is in operation, as represented by block 120, and after it has been trained with voice commands for each user, sound data is constantly monitored at block 122 to determine if a voice command has been uttered. The sound data may contain a combination of voice commands and background noise such as voice conversations, machinery, television, radio, and the like, or any combination thereof It is not only necessary to separate the voice commands from the background noise in order to issue a control command to a switching device (such as the dimmer control circuit 16 in FIG. 5), but it is also necessary to properly interpret the voice commands received.

Speech recognition is a process by which one or more unknown speech utterances are identified. Speech recognition is generally performed by comparing the features of an unknown utterance with the features of known words. Known words as used herein include, without limitation, words, phrases, phonetic units, and/or phonemic units. The features, or characteristics, of the known words are typically defined through a training process wherein samples of known words are examined and their features are recorded as recognition models in a recognition database. Each recognition model is essentially a reference pattern which represents a single word. Thus, depending on the number of words in a voice command, there will be a corresponding number of recognition models.

The sounds in the data stream are classified and ordered at block 124, in a well-known manner. The particular features associated with the unknown utterance are often referred to as a "test pattern." The micro-controller 14 compares the test pattern to one or more voice recognition models or templates 128, 130 and 132, e.g. the trained voice commands, or combinations thereof, as represented by block 126. As illustrated, the templates 128, 130 and 132 might include the voice commands "lightson", "lightsoff", and "dimlights", respectively. A scoring technique is then used at block 134 to provide a relative measure of how well various recognition model combinations match the test pattern. The unknown utterance is recognized by the known words associated with the recognition model(s) with which the test pattern most closely matches.

As set forth previously, there are many types of speech recognizers, such as, for example, conventional template-based and Hidden Markov Model (HMM) recognizers, as well as recognizers utilizing recognition models based on neural networks. Without loss of generality, the present invention will be illustrated by way of example to the HMM recognizers.

Wordspotter algorithms typically use a recognition network which allows the test pattern to be recognized in terms of a sequence of keyword, filler and silence models. The keyword model refers to voice command words that are to be recognized by the micro-controller 14, while the filler model refers generally to extraneous background noise that is discarded by the micro-controller. The silence model represents the stationary background noise that occurs before and after keyword utterances. Because of the stationary condition, the silence model is typically modeled with a single looped HMM state in order to detect the beginning and ending of a keyword utterance. In HMM's, a state can be traversed one frame at a time wherein a frame update typically occurs every 10 msec. A formal technique for finding the single best model sequence exists, and is called the Viterbi algorithm (Forney, Jr., G. D., "The Viterbi algorithm", Proc. IEEE, Vol. 61, pp. 268–278, March 1978). Rather than calculating the score for every possible model sequence, the Viterbi algorithm reduces the computational load by eliminating all but the best of those partial sequences that merge at a common point, otherwise known as a recombination point.

The keyword detection and false alarm rate for each keyword can be adjusted by adding a score on entering the keyword model, also known as a word entrance penalty. A higher word-entrance penalty results in a lower key word detection and thus results in a lower false alarm rate. This is because the higher cumulative score makes the keyword model less likely to win against the other models at the recombination point. For example, referring to FIG. 3, when a user utters the command "Dim Lights," the cumulative score $S_A$ for "Dim" and "Lights" will most likely be lower when compared to the "DIMLIGHTS" template 132 than the cumulative scores for the other templates 128, 130.

After the score $S_A$ has been generated for the closest matching command template (block 134), the classified data or "test pattern" is compared at block 136 to an "All Other Sounds" template or filler model 138 which has no defined structure, as in background noise such as voice conversations, machinery, television, radio, and the like, or any combination thereof A score $S_B$ is then generated at block 140. The scores $S_A$ and $S_B$ are then compared at block 142. If the score $S_A$ is smaller than the score $S_B$, then the likelihood that the sound data is a voice command is greater than the likelihood that the sound data is just background noise. Consequently, the system is appropriately triggered at block 144, depending on the closest matching command template in order to control a lamp or other electrical device. If, however the score $S_A$ is greater than the score $S_B$, then the likelihood that the sound data is a voice command is less likely that the sound data is just background noise. Consequently, the apparatus 10 continues to receive sound data at block 122.

Figure 4:
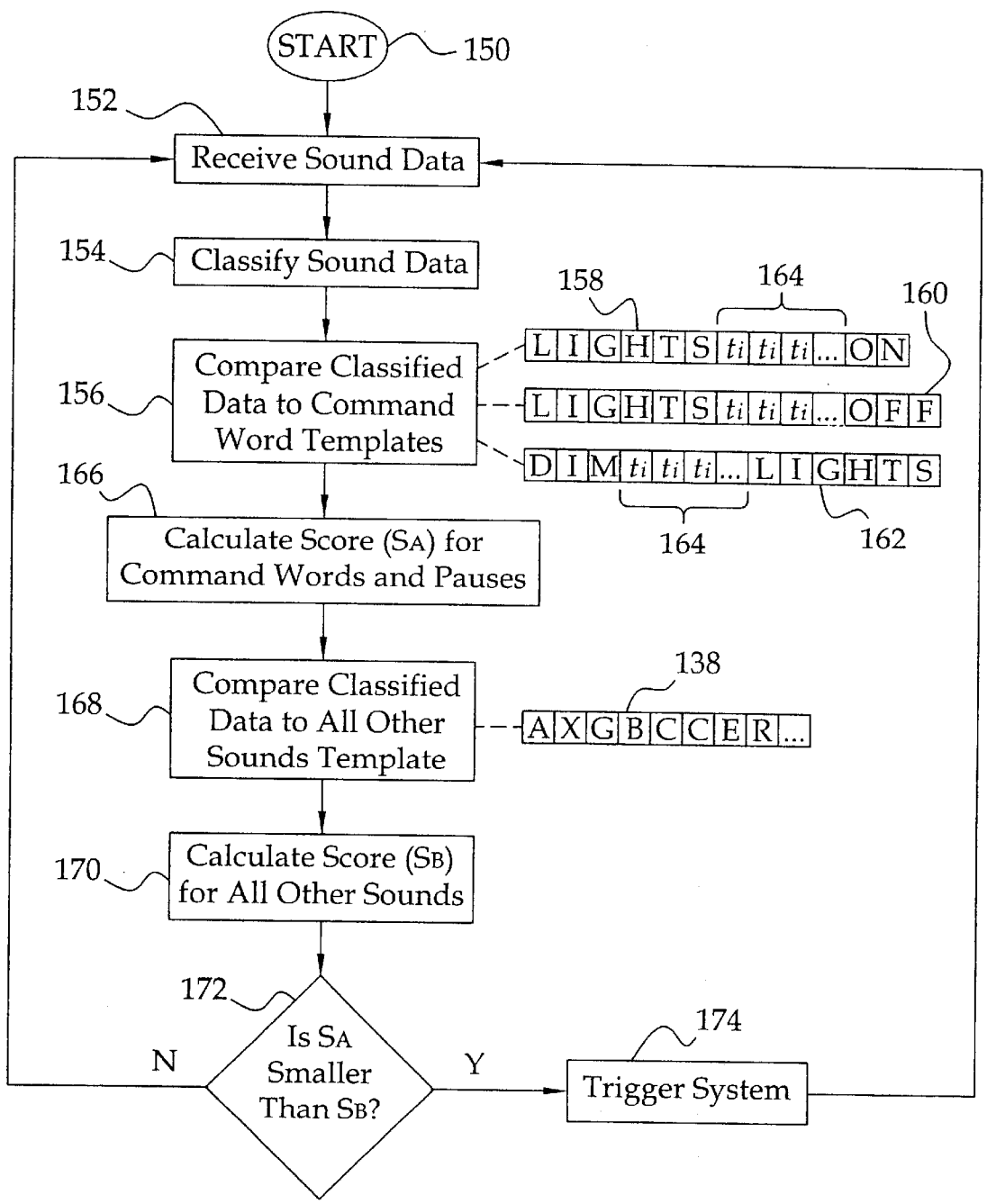
FIG. 4 is a process flow chart according to the invention for recognizing the presence of a voice command.

With reference now to FIG. 4, a method of receiving sound data and recognizing voice commands from the sound data for use in the apparatus 10 is illustrated. When the apparatus 10 is in operation, as represented by block 150, and after it has been trained with voice commands for a user, sound data is constantly monitored at block 152 to determine if a voice command has been uttered. As described above, the sound data may contain a combination of voice commands and background noise such as voice conversations, machinery, television, radio, and the like, or any combination thereof The sounds in the data stream are then classified and ordered into a test pattern at block 154, in a well-known manner. The micro-controller 14 compares the test pattern to one or more voice recognition models or templates 158, 160 and 162, e.g. the trained voice commands, or combinations thereof, as represented by block 156.

As illustrated, each of the voice templates 158, 160 and 162 includes a pause model 164 of predefined duration between keywords in the voice commands. Thus, the command "lightson" in the previous example becomes "lights<pause>on". The command "lightsoff" becomes "lights<pause>off", and the command "dimlights" becomes "dim<pause>lights". The duration of the pause model 164 between each command word may vary depending on the particular speaking style of the user(s), but should be at least one syllable (about 200 msec.) in length. As noted above, the Figure of Merit (FOM) increases with the number of syllables contained in a voice command. For an even greater increase in command detection accuracy, a pause may also be added before and/or after each command word. Thus, instead of a two-syllable command for "lightson", a three-syllable command "lights<pause>on" increases the FOM, while a five-syllable command "<pause>lights<pause>on<pause>"greatly increases the FOM without increasing the number of words in the voice command. This is especially advantageous since the user is not required to memorize long phrases (e.g. five-syllable phrases) for each voice command in order to obtain greater detection accuracy over the prior art.

In order to impose a minimum pause duration of about 200 msec, the pause model 164 needs to contain at least N silence states (represented by $s_i$ in FIG. 4) where N=minimum pause duration/frame update=200 msec/10 msec=20.

Because each state $s_i$ is modeling the same features as the single silence state, the pause model is created by simply concatenating N silence states. While the minimum duration spent in the pause model is controlled by the number of states, a maximum model duration can be accounted for by adding a pause score whenever a state loops back on itself. The score is called loop transition penalty. Although loop transition penalties cannot completely prevent the best state sequence from remaining longer than a fixed amount of frames in the model, pauses longer than N frames become less likely with duration. Note that each pause model can have a different number of states in order to allow modeling speech pauses of different duration. In particular, pauses at the beginning and end of a voice command do not impede fluency and thus may be chosen to be substantially longer than pauses in between words.

The presence of a pause is preferably determined by analyzing both the spectral content and the energy content of the pause before and/or after the detection of a keyword, depending on the particular sequence of pauses and keywords. If dynamic spectral activity is present at a position in the voice data where the pause should be, such as in the case of voice data, and if the dynamic spectral activity has an energy content that is within a preset energy range of the keyword energy content, then it is determined that no pause has occurred. In the case where the pause has dynamic spectral activity below the preset energy range, such as in the case of background noise present between keyword utterances, then it is determined that a pause has occurred.

Thus at block 166, a cumulative score $S_A$ is calculated based on each of the command words and pauses in the voice command to thereby provide a relative measure of how well various recognition model combinations match the test pattern. The unknown utterance must not only have the sound sequence correct, but must also have the unnatural breaks in sound (the pauses) at the correct time in order to create a competitive score for triggering the system.

After the score $S_A$ has been generated for the closest matching command template, the classified data or "test pattern" is compared at block 168 to the "All Other Sounds" template or filler model 138. A score $S_B$ is then generated at block 170. The scores $S_A$ and $S_B$ are then compared at block 172. If the score $S_A$ is smaller than the score $S_B$, then the likelihood that the sound data is a voice command is greater than the likelihood that the sound data is just background noise. Consequently, the system is appropriately triggered at block 174, depending on the closest matching command template. If, however the score $S_A$ is greater than the score $S_B$, then the likelihood that the sound data is a voice command is less than the likelihood that the sound data is just background noise. Consequently, the apparatus 10 continues to receive sound data at block 152.

Because the invention treats the speech pauses as part of the keywords in the voice commands, a high likelihood spore during one or more pauses may compensate the effect of low likelihood scores during the actual words. Thus, some similar sounding utterances may get accepted as keywords primarily due to a good fit during the speech pauses. In order to prevent this from happening, another recognition network may be used in which the contributions from the pause models and the speech models to the overall likelihood score $S_A$ can be uncoupled by making the filler and silence models compete with each pause model and speech model individually. This architecture allows speech utterances to be accepted as valid keywords only if each pause and speech model has been determined to be more likely than any sequence of filler and silence models.

In this recognition network, each individual pause and speech model is assigned a word-entrance penalty whose value is made dependent on the best preceding model as determined by the Viterbi recombination. The word-entrance penalty is assigned a finite value, whenever the best predecessor model (as determined by the Viterbi algorithm) corresponds to the syntactically proper predecessor model (as determined by the structure of the keyword model, e.g. (<pause>speech1<pause>speech2< . . . ). In all other cases, the word-entrance penalty is assigned an infinite value which will inhibit all remaining parts of the keyword model from being further traversed. A keyword is detected as soon as the last model of that keyword survives the recombination step.

The particular values for the finite word-entrance penalties determine the detection and false alarm rate of the corresponding keywords. Because all possible state sequences through the pause models represent a subset of all state sequences through the filler and silence models, the pause models would always lose during recombination. In order to prevent this from happening, the pause models are rewarded upon entry by using negative (rather than positive) word-entrance penalties.

Figure 5:
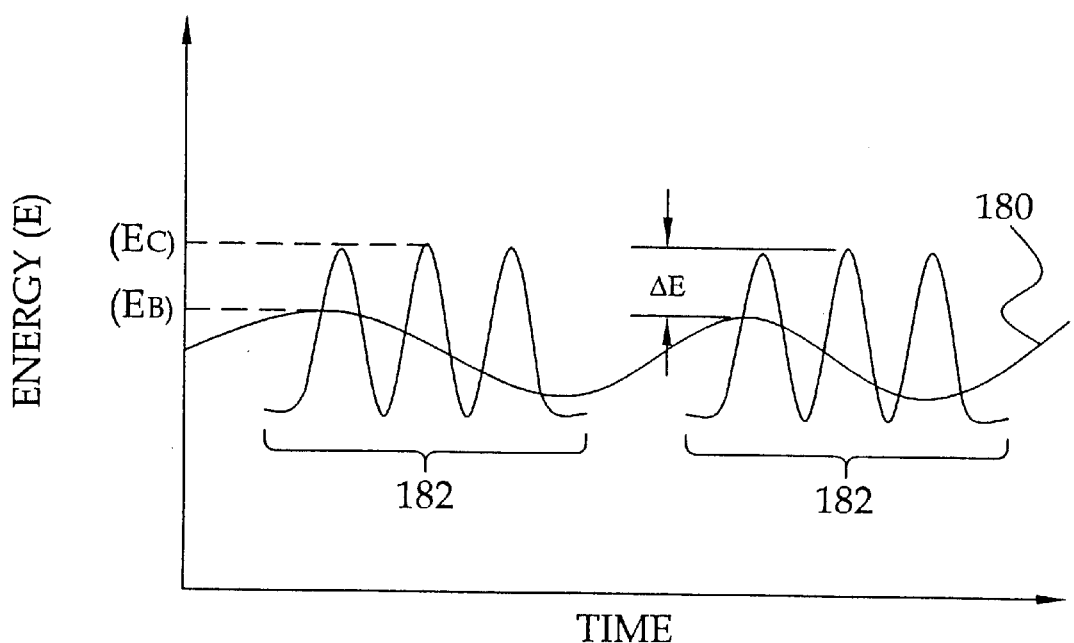
FIG. 5 is a chart schematically representing an acceptable energy level of voice command to background noise for actuating an electrical device.
Figure 6:
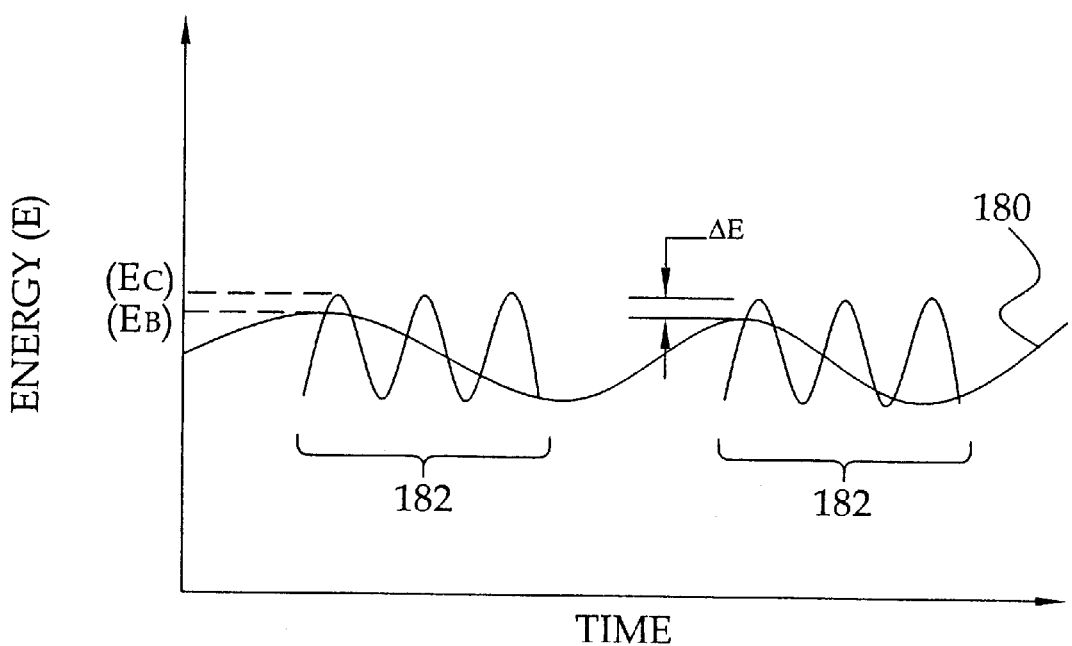
FIG. 6 is a chart schematically representing an unacceptable energy level of voice command to background noise for actuating an electrical device.
Figure 7:
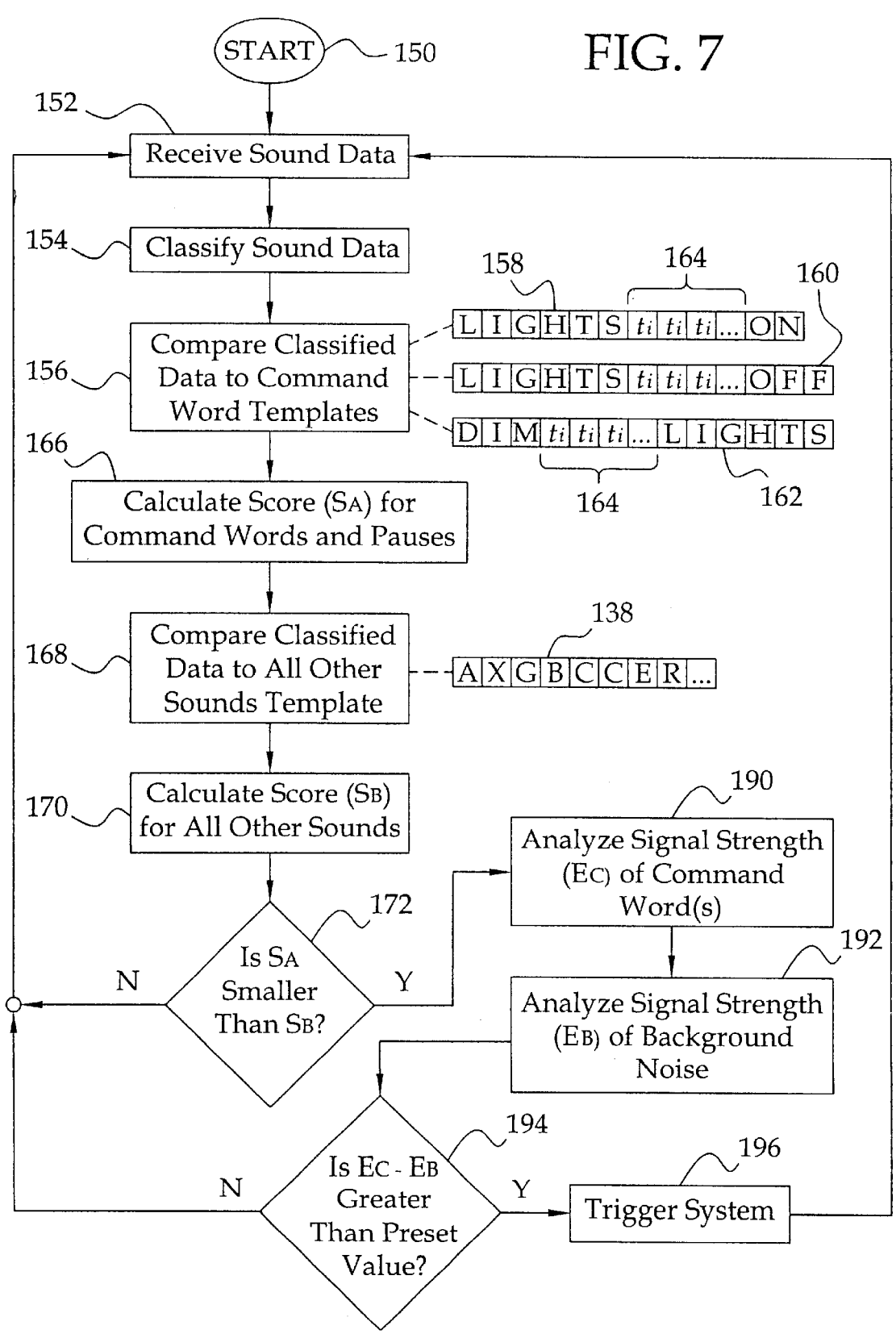
FIG. 7 is a process flow chart according to a further embodiment of the invention for recognizing the presence of a voice command.

With reference now to FIGS. 5 to 7, a further embodiment of the invention is illustrated, wherein like elements in the previous embodiment are represented by like numerals. Additional accuracy of voice command detection can be obtained by comparing the energy ($E_B$) of background noise 180 to the energy ($E_C$) of a keyword utterance 182 (see FIGS. 5 and 6). If, after it is determined that $S_A$ is greater than $S_B$ at block 170 in FIG. 7, the signal strength $E_C$ is analyzed at block 190 and the background noise signal strength $E_B$ is analyzed at block 192. It is then determined if the difference E between the energy $E_C$ of the keyword utterance and the energy $E_B$ of the background noise is above a predetermined value at block 194, and as shown in FIG. 5. If E is above the predetermined value, then the system is triggered at block 196. However, if the sound data does not contain enough energy to meet the established energy difference E (see FIG. 6), then the micro-controller assumes that the whole sound data is background noise and does not trigger the system. Instead of taking the difference between the energies, the ratio or some other means of comparing the energies can be provided.

With the above-described arrangement, the user can enter commands even in loud environments by talking louder than the background. In this way, the keyword<pause>keyword structure can be maintained even if the pause portion is not actually silent. Consequently, the pause portion is only required to have an energy level that is a certain amount lower than the keywords. In many instances, the pause portion will most likely have an energy level equal to the background noise, unless a noise-canceling microphone or the like is used.

Although it is preferred that the signal strength be analyzed and compared after the voice command has met the criteria for both the command words and the pauses, analysis of the voice commands may be triggered only when the difference or ratio between a detected energy level of sound data and background noise is above a predetermined amount.

Figure 8:
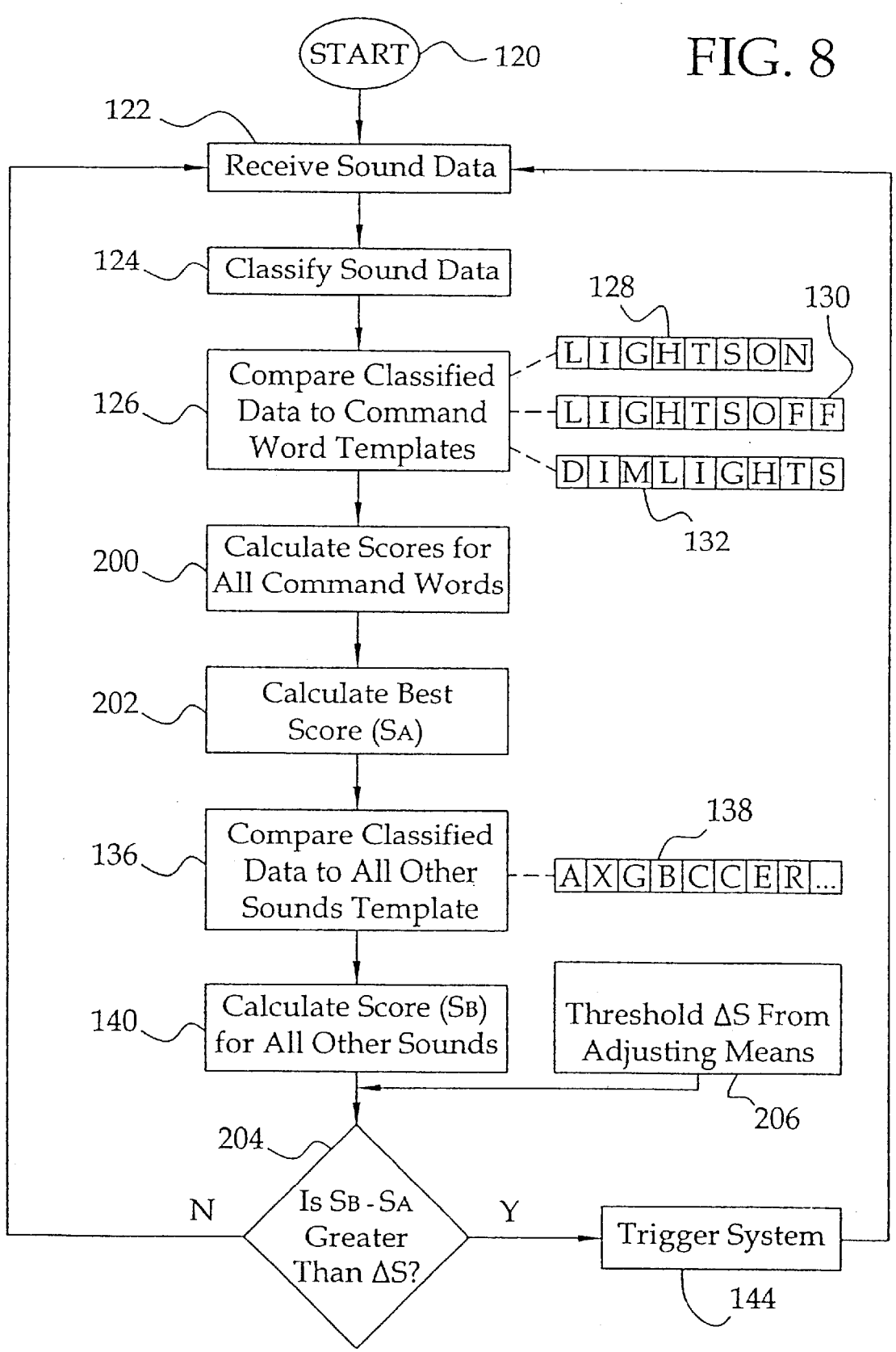
FIG. 8 is a process flow chart according to an even further embodiment of the invention for recognizing the presence of a voice command.

Turning now to FIG. 8, a modified method of receiving sound data and recognizing voice commands from the sound data according to a further embodiment is illustrated, wherein like parts in the FIG. 3 embodiment are represented by like numerals. In this embodiment, the classified sound data is compared to the word templates at block 126 and scores are generated for all command word templates at block 200. It is then determined at block 202 which of all the generated scores is the best, i.e. which template matches most closely with the classified sound data. The speech recognition system has an analysis phase that takes the intrinsic features of a speech signal and extracts some data points from that signal. Those data points are then compared to corresponding data points in the prestored templates. The speech recognition system attempts to determine how likely it is that each one of those data points (in the actual signal) is to the data point that is expected to be seen in the prestored template. Thus, the analysis looks at the incoming data and determines the likelihood of this data correlating with the prestored data. The output is represented as a series of scores or emission probabilities, which represents how close or how well the incoming data and the template data match. As the analyzing portion of the speech recognition system makes it's comparison, it determines the likelihood of how well a data point "A" in the incoming data will match with data point "A" in each of the templates, the likelihood of how well data point "B" in the incoming data will match with data point "B" in each of the templates, and so on. Thus, if there are 20 templates in a system, the system will look at the incoming signal and determine it's sum probability close to the data points A, B, C, etc., with the corresponding data points in templates 1, 2, 3, . . . 20. The template with the greatest sum probability is then chosen as the most likely candidate for the uttered command word. For example, the system will indicate that out of 20 prestored templates, the incoming data most highly correlates to Template No. 5. The scores for the templates are compared to the scores of the All Other Sounds Template, as represented by block 204. If the scores of the All Other Sounds Template minus the scores of the most likely template is less than a threshold value S, then the activation system is triggered, as represented by block 144. If however the difference between the scores is greater than the threshold value S, then the speech recognition system determines that the incoming data is not one of the 20 templates. It is not a recognized voice command, and the activation system is not triggered.

According to a unique feature of the invention, the threshold value S can be set by a user through the provision of a threshold adjusting means 206 connected to the microcontroller so that a user can adjust a desired threshold value to thereby effect the outcome of the system. The effect of this is to allow someone who's speech is less compatible with the data represented by templates to use the system with a much higher degree of accuracy or responsiveness by adjusting characteristics that are used to determine whether an uttered word matches the stored data. This is different from speaker adaptive systems used in prior art, wherein the templates were modified based on some user input. In this case, the templates are not adjusted, rather the predetermined threshold used to quality whether a word is a match is adjustable by the user.

In the invention, preferably, the means for adjusting the threshold value comprises a trim potentiometer that has a digital interface to the speech recognition system. Thus, the setting of the trim potentiometer is sampled or sensed by the speech recognition system. The threshold value S can be either a discrete step-wise representation of values like integers, such as integers 1, 2, 3, 4, 5, 6, etc. or a continuous relatively fine adjustment, e.g. any value between 0 and 9 rather than the integers. This provides either a fixed step-wise adjustment or continuous adjustment of the threshold value. Although a trim potentiometer is preferred, the threshold adjusting means can take the form of a thumbwheel or sliding potentiometer, a rotary or slide switch with multiple detent switch positions, a DIP switch, an optical encoder, a variably adjustable capacitor, or any other electronic or digital means for adjusting the threshold value.

The threshold adjusting means, no matter what form it takes, sets the point at which the speech recognition system recognizes an uttered command word, i.e. to set the degree of correlation between the incoming data and the template data to thereby trigger the system. This adjusting means allows selective adjustment by a user of the parameters of the similarity measurement, which could either be statistical or rule-based. However, in either case, this would allow a user to adjust a parameter in an embedded system that would normally be fixed. The parameter can have either the effect of adding weight to the output probabilities of the command words or the output probabilities of the All Other Sounds Template. The effect of the adjustment would be to either change the number of false activation's or change the number of positive detections that a speech recognition system makes. Thus, when a stream of incoming data is compared to the data of the prestored templates, adjusting the threshold value S to a greater value permits a person to utter a command word that is less correlated with the templates in order for the speech recognition system to consider it a match. A sequence is generated that best describes the signal. That sequence of features is then compared to a series of features that stored in the templates. Each data point in the incoming signal is compared to a corresponding area of each stored template and scores are generated to represent how closely the input signal matches each one of the templates. Accordingly, data points that at one point can be rejected because the All Other Sounds Template have created the best score, will now be considered as a match because the All Other Sounds Template or the other command word templates were adjusted through the threshold value adjusting means. Although described specifically for use with the Hidden Markov Model, it is to be understood that the threshold adjusting means can be applied to other speech recognition systems.

While the invention has been taught with specific reference to the above-described embodiments, those skilled in the art will recognize that changes can be made in form and detail without departing from the spirit and the scope of the invention. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The embodiments for which an exclusive property or privilege is claimed are defined as follows:

1. An apparatus for voice activated control of an electrical device, the apparatus comprising:
   receiving means for receiving at least one audio command generated by a user, the at least one audio command having a command word portion and a pause portion, each of the audio command portions being at least one syllable in length;
   speech recognition data having a command word portion and a pause portion, each of the speech recognition data portions being at least one syllable in length;
   speech recognition means including a Hidden Markov Model for comparing said command word portion and said pause portion of said at least one received audio command with said command word portion and said pause portion, respectively, of said speech recognition data, said speech recognition means generating at least one control signal based on said comparison, said speech recognition means prevents operation of the electrical device when the spectral content is dynamic;
   means for analyzing the pause portion of the received audio command for spectral content; and
   power control means for controlling power delivered to an electrical device, said power control means being responsive to said at least one control signal generated by said speech recognition means for operating the electrical device in response to said at least one audio command generated by the user.

2. The apparatus of claim 1, wherein said receiving means receives background noise data in conjunction with said audio command, and further comprising means for generating a command word score and a background noise score based on the comparison of the received audio command to the speech recognition data and the background noise data, respectively, said speech recognition means generating said at least one control signal when said command word score exceeds said background noise score.

3. The apparatus of claim 2, and further comprising:
   means for analyzing the command word portion of the received audio command and the background noise data for energy content; and
   means for comparing the energy content of the command word portion to the energy content of the background noise data and generating a corresponding energy comparison value;
   wherein said speech recognition means prevents the generation of said at least one control signal when said energy comparison value is below a predetermined level.

4. The apparatus of claim 1, wherein said receiving means receives background noise data in conjunction with said audio command, and further comprising:
   means for analyzing the command word portion of the receive audio command and the background noise data for energy content; and
   means for comparing the energy content of the command word portion to the energy content of the background noise data and generating a corresponding energy comparison value;

wherein said speech recognition means prevents the generation of said at least one control signal when said energy comparison value is below a predetermined level.

5. The apparatus of claim 1, wherein each of said at least one audio command and said speech recognition data comprises first and second command word portions separated by said pause portion and further comprising a second pause portion having one syllable in duration before said first command word portion and a third pause portion having one syllable in duration after said second command word portion.

6. The apparatus of claim 1, wherein the speech recognition means further including a microcontroller with a fixed-point embedded microprocessor, the microprocessor is chosen from the group of 8-bit and 16-bit micro controller unit-microprocessors.

7. A method of activating an electrical device through at least one audio command from a user, the method comprising the steps of:

recording speech recognition data having a command word portion and a pause portion, each of the speech recognition data portions being at least one syllable in length;

receiving at least one audio command from a user, the at least one audio command having a command word portion and a pause portion, each of the audio command portions being at least one syllable in length;

comparing said command word portion and said pause portion of said at least one received audio command with said command word portion and said pause portion, respectively, of said speech recognition data;

generating at least one control signal based on said comparison;

controlling power delivered to an electrical device in response to said at least one control signal for operating the electrical device in response to said at least one received audio command;

analyzing the pause portion of the received audio command for spectral content; and preventing operation of the electrical device when the spectral content is dynamic.

8. The method of claim 7, wherein the step of recording speech recognition data includes recording the voice of a user while the user utters said at least one audio command.

9. The method of claim 8, and further comprising the steps of receiving background noise data in conjunction with receiving said at least one audio command;

comparing the background noise data to the at least one received audio command;

generating a command word score from the comparison of the received audio command to the voice recognition data;

generating a background noise score based on the comparison of the received audio command to the background noise data; and generating said at least one control signal when said command word score exceeds said background noise score.

10. The method of claim 7, and further comprising:

ascertaining a first energy content for the command word portion of the received audio command;

ascertaining a second energy content for the received background noise data;

comparing the first and second energy contents and generating an energy comparison value; and preventing the generation of said at least one control signal when said energy comparison value is below a predetermined level.

11. The method of claim 9, wherein the step of generating a command word score includes assigning a word entrance penalty to the command word portion and the pause portion.

12. The method of claim 11, wherein the word entrance penalty of the pause portion is negative.

13. The apparatus of claim 12, and further comprising a second pause portion having one syllable in duration before said first command word portion and a third pause portion having one syllable in duration after a second command word portion.

14. The method of claim 7, and further comprising:

receiving background noise data in conjunction with receiving said at least one audio command;

ascertaining a first energy content for the command word portion of the received audio command;

ascertaining a second energy content for the received background noise data;

comparing the first and second energy contents and generating a corresponding energy comparison value; and preventing the generation of said at least one control signal when said energy comparison value is below a predetermined level.

15. The apparatus of claim 7, wherein each of said at least one audio command and said speech recognition data comprises at least first and second command word portions separated by said pause portion.

16. A method of activating an electrical device through at least one audio command from a user, the method comprising the steps of:

recording speech recognition data having a command word portion and a pause portion, each of the speech recognition data portions being at least one syllable in length;

receiving at least one audio command from a user, the at least one audio command having first and second command word portions and a first, second and third pause portions, each of the audio command portions being at least one syllable in length, said second pause portion having one syllable in duration before said first command word portion and said third pause portion having one syllable in duration after said second command word portion;

comparing said command word portion and said pause portion of said at least one received audio command with said command word portion and said pause portion, respectively, of said speech recognition data;

generating at least one control signal based on said comparison;

controlling power delivered to an electrical device in response to said at least one control signal for operating the electrical device in response to said at least one received audio command.

* * * * *